May 20, 1930.  J. S. GEORGE ET AL  1,759,502
METHOD OF AND APPARATUS FOR COATING ARTICLES
Filed Aug. 11, 1925    6 Sheets-Sheet 1
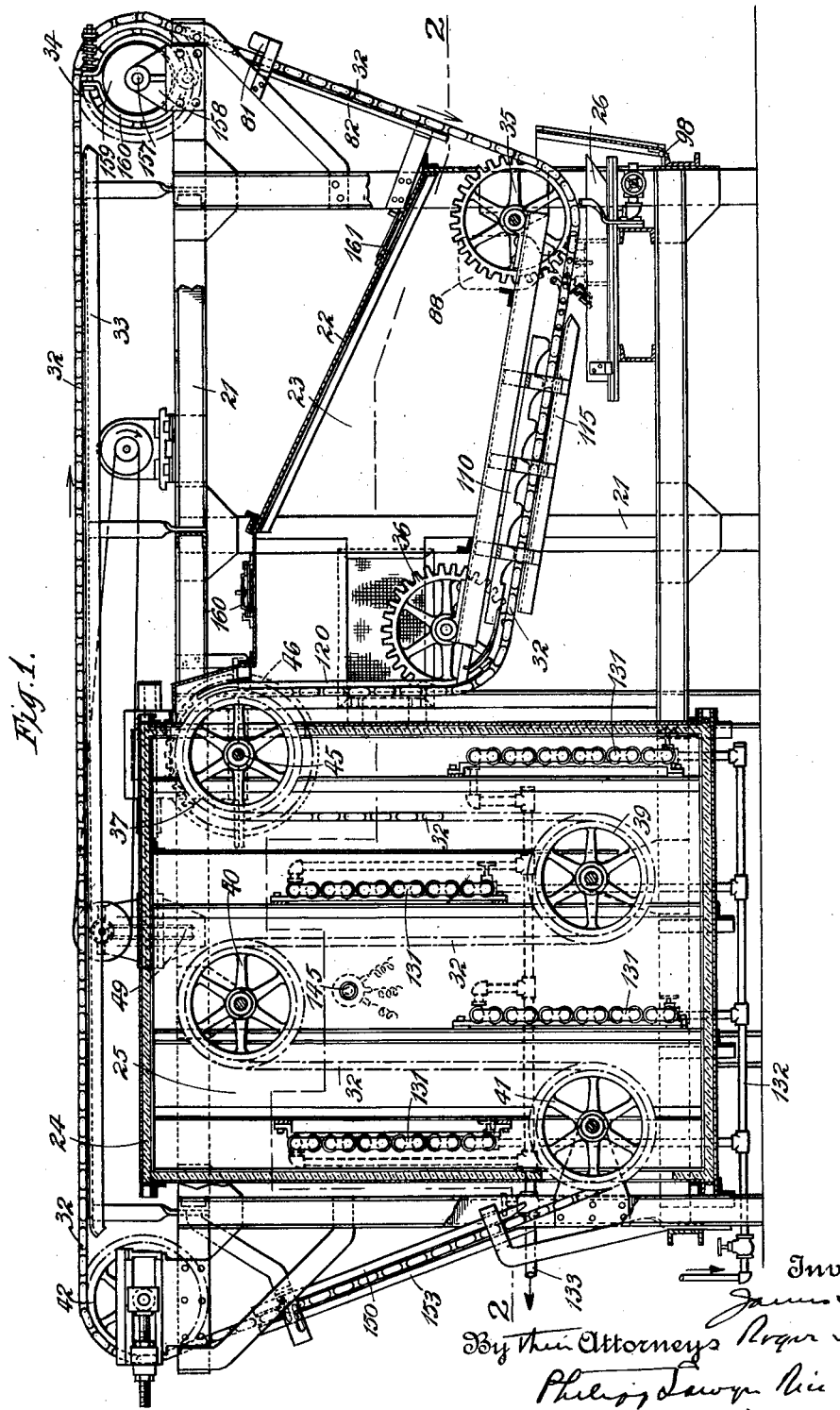

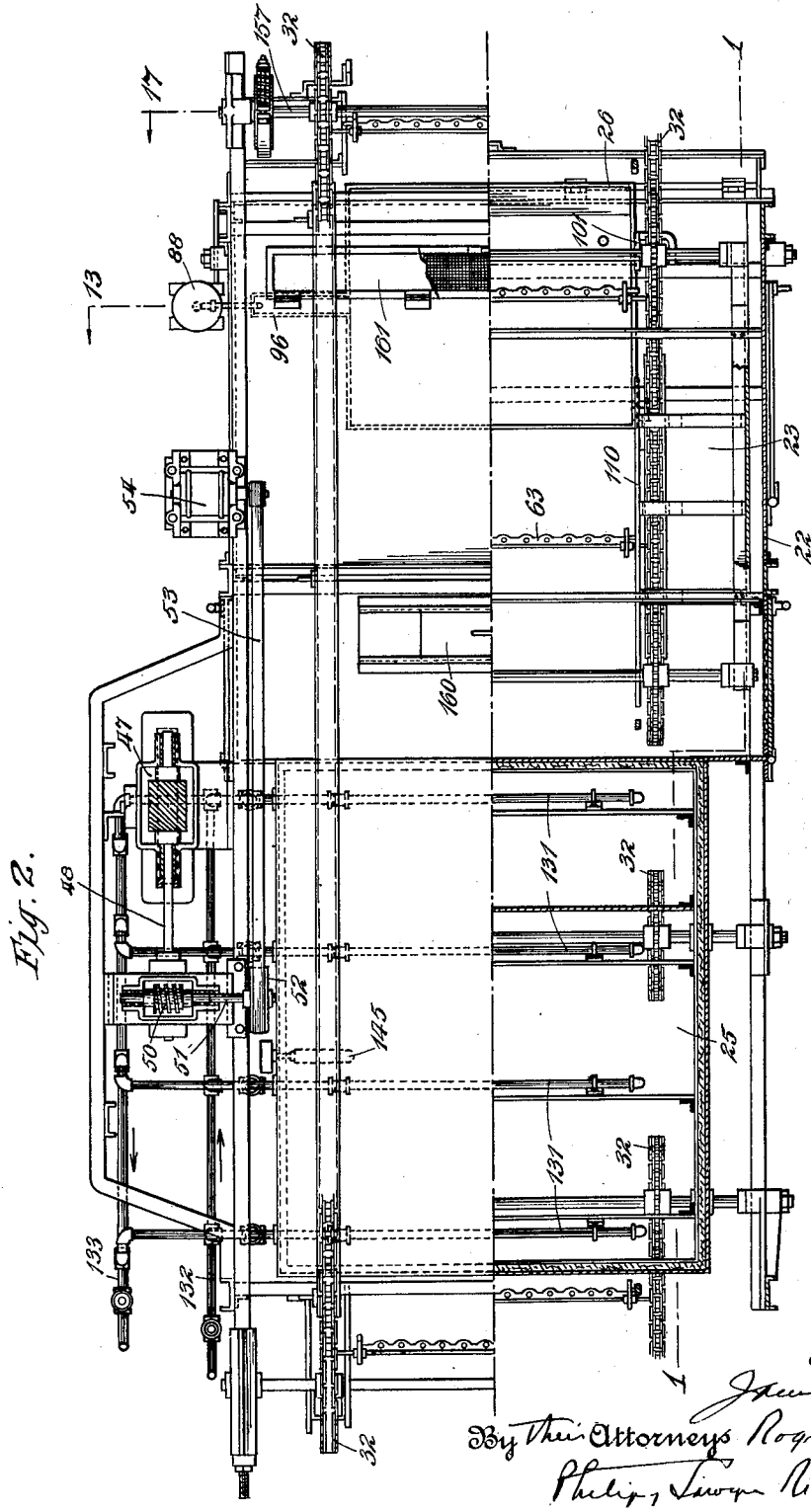

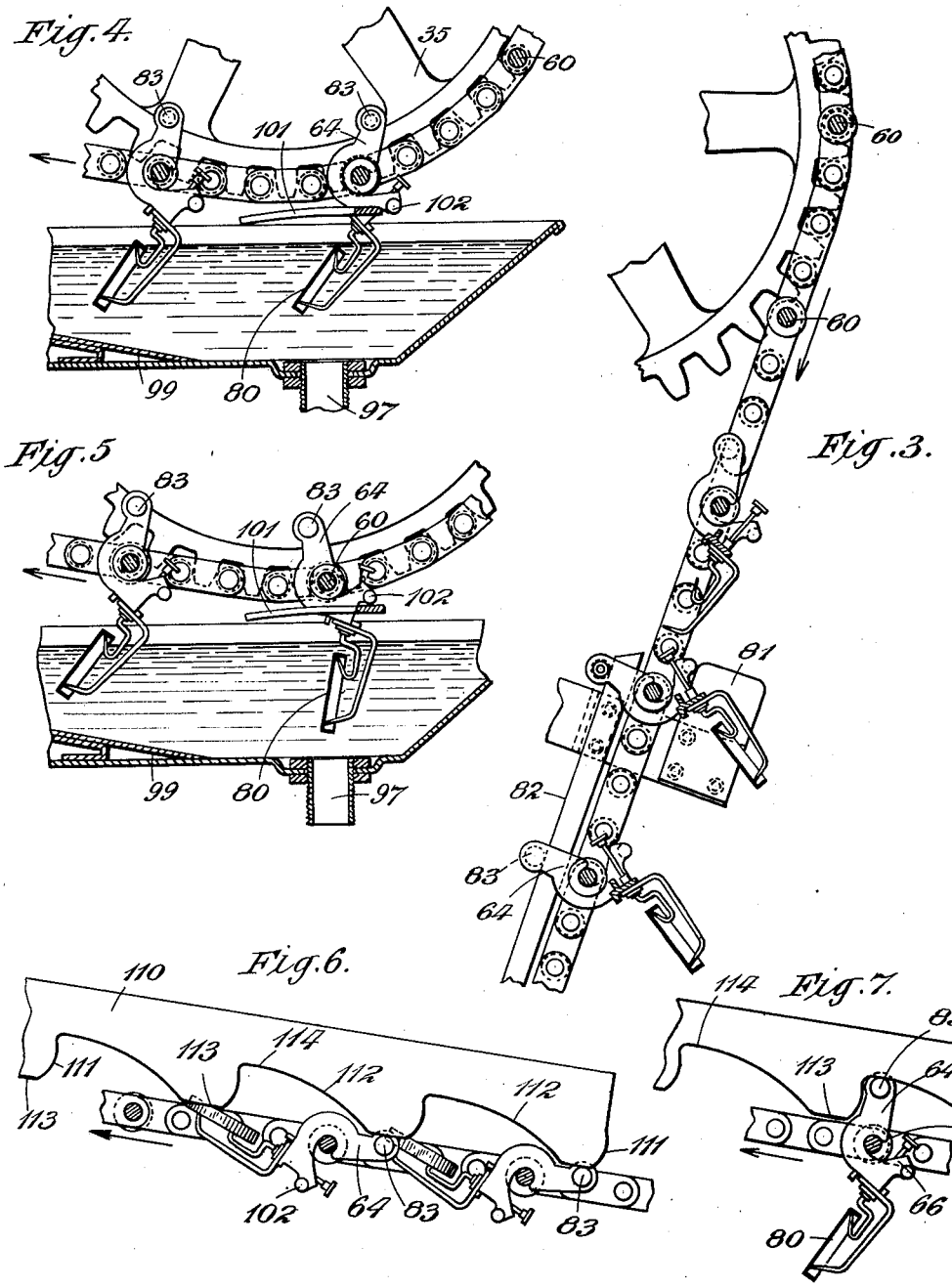

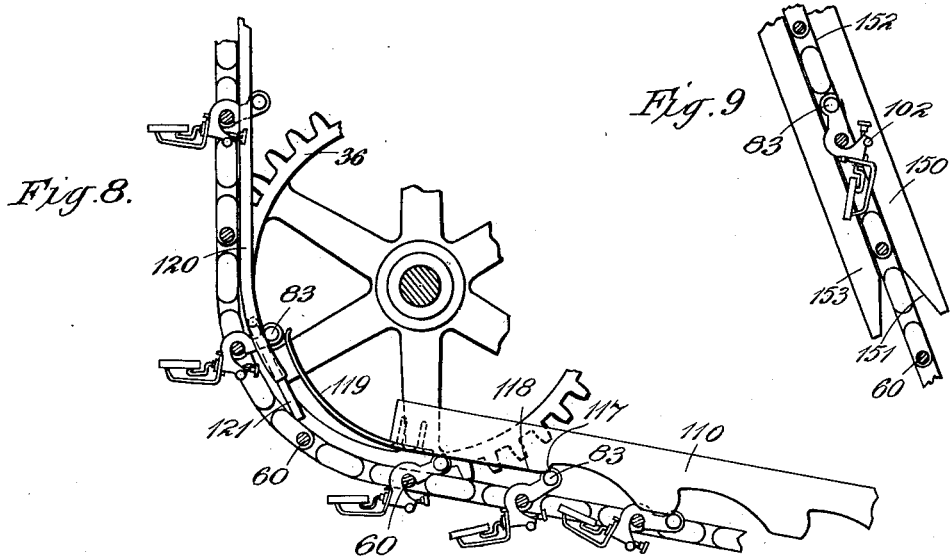
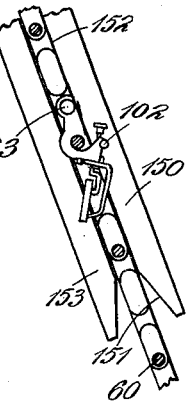
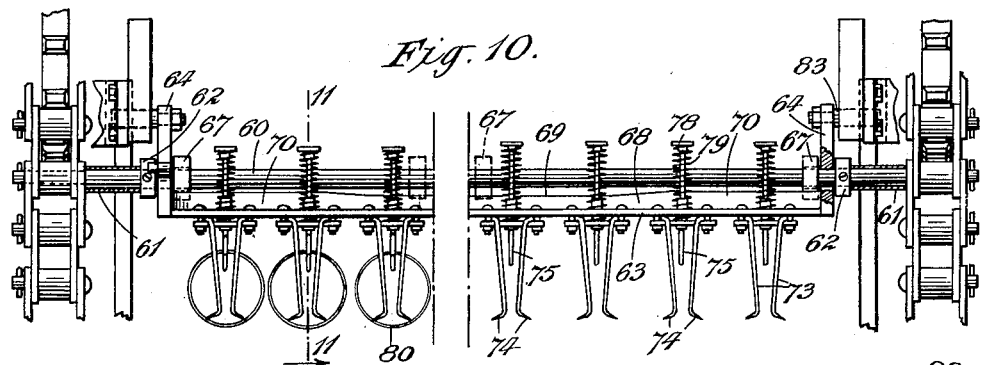
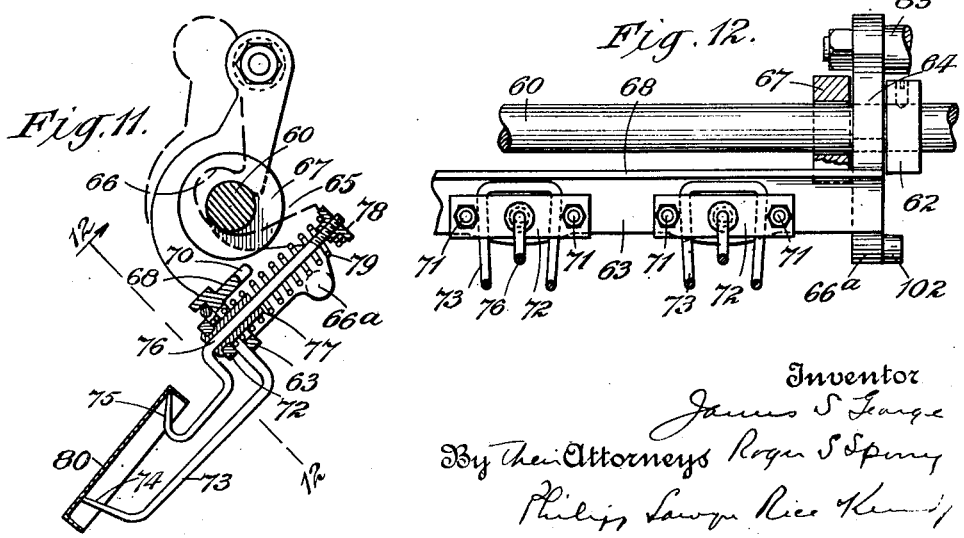

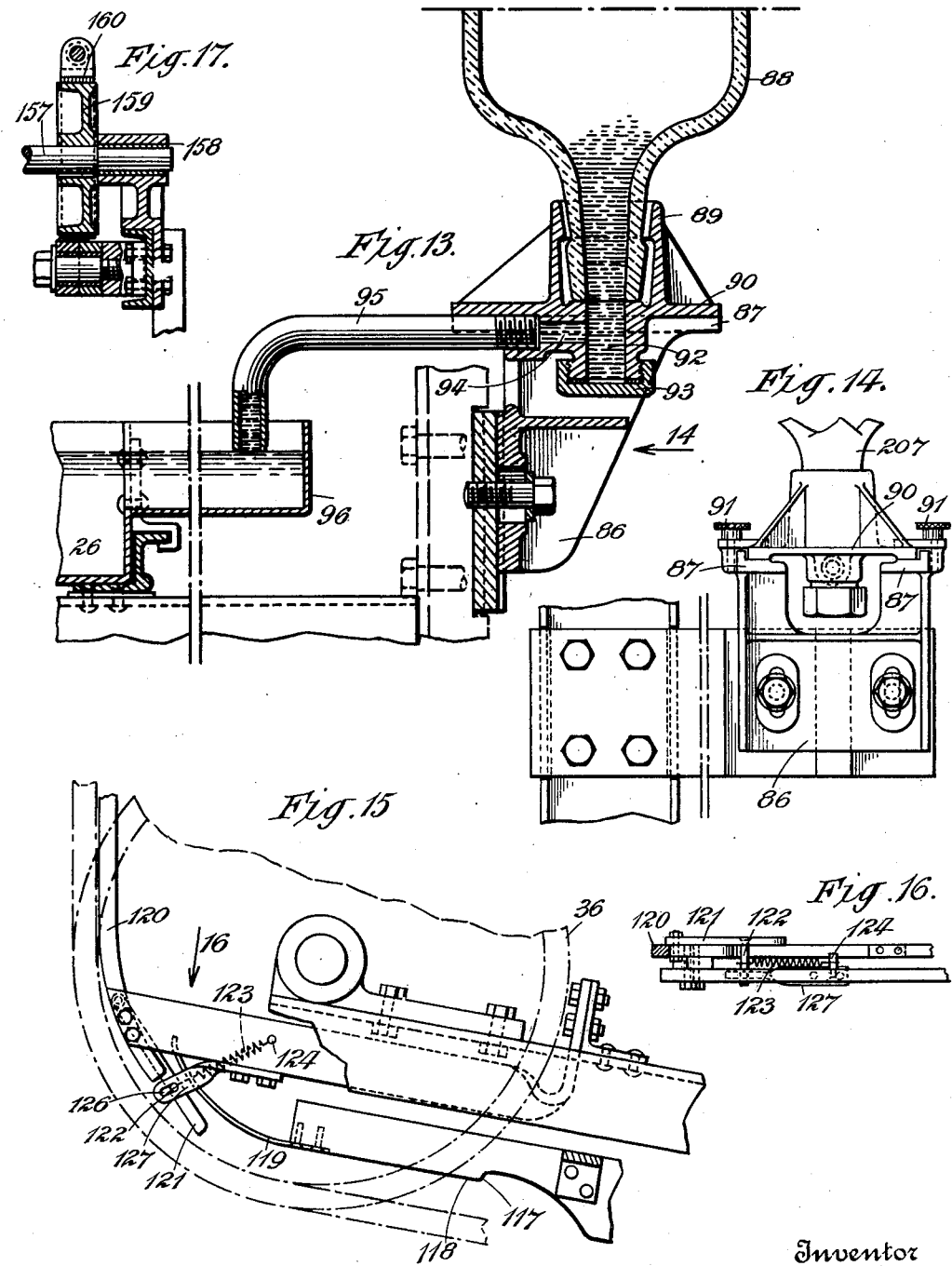

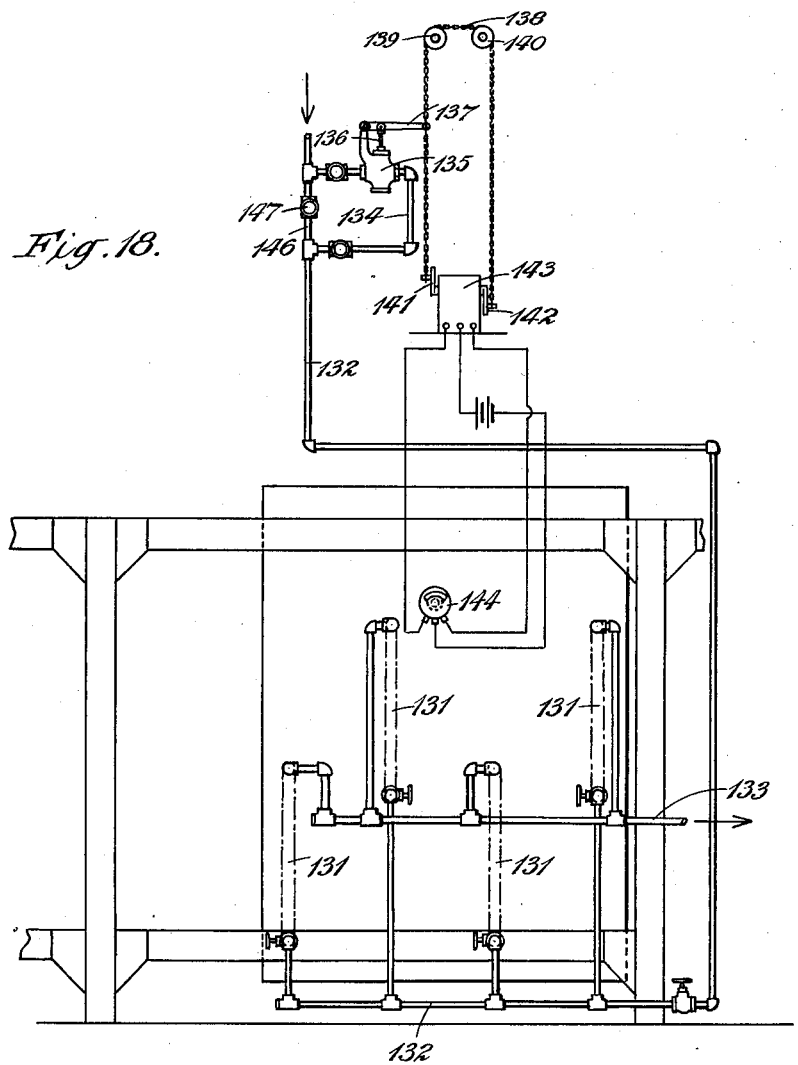

Patented May 20, 1930

1,759,502

UNITED STATES PATENT OFFICE

JAMES SCOTT GEORGE AND ROGER S. SPERRY, OF WATERBURY, CONNECTICUT, ASSIGNORS TO SCOVILL MANUFACTURING COMPANY, OF WATERBURY, CONNECTICUT, A CORPORATION OF CONNECTICUT

METHOD OF AND APPARATUS FOR COATING ARTICLES

Application filed August 11, 1925. Serial No. 49,524.

This invention relates to apparatus for coating articles and more particularly for coating metal articles by dipping the same in a lacquer bath.

It is an object of the invention to provide an apparatus for coating articles such that the finished articles have a uniformly even coating of the proper thickness and free from blemishes and such that a commercially economical production can be obtained.

With these general objects, and others in view, the invention consists in the features, combinations, details of construction and arrangements of parts which will first be described in connection with the accompanying drawings, and then more particularly pointed out.

In the drawings—

Figure 1 is a sectional view taken on the broken line 1—1 of Fig. 2, of an apparatus constructed in accordance with the invention, parts being indicated diagrammatically and certain parts being omitted;

Figure 2 is a sectional view taken on the broken line 2—2 of Fig. 1, with parts broken away and certain parts omitted;

Figure 3 is a detail view showing in vertical section and enlarged a portion of the apparatus at the loading station;

Figures 4 and 5 are similar views at the dipping station;

Figures 6 and 7 are fragmentary views showing, in vertical section, two positions of the parts just beyond the dipping station;

Figure 8 is a similar view (reduced) showing the parts just beyond the positions of Figs. 6 and 7;

Figure 9 is a similar view at the unloading station;

Figure 10 is a detail view (enlarged) showing, in side elevation and partly in section, one rack unit;

Figure 11 is a sectional view (enlarged) taken on the line 11—11 of Fig. 10, looking in the direction of the arrow;

Figure 12 is a sectional view taken on the line 12—12 of Fig. 11, looking in the direction of the arrow;

Figure 13 is a sectional view (enlarged) taken on the line 13—13 of Fig. 2, looking in the direction of the arrow;

Figure 14 is a fragmentary view in side elevation looking in the direction of the arrow 14 of Fig. 13;

Figure 15 is a fragmentary view showing in side elevation with parts broken away and parts in section and parts indicated diagrammatically, that portion of the apparatus shown in Fig. 8;

Figure 16 is a fragmentary sectional view looking in the direction of the arrow 16 of Fig. 15;

Figure 17 is a sectional view (enlarged) taken on the line 17—17 of Fig. 2 looking in the direction of the arrow; and, Figure 18 is a diagrammatic view of the heating system and control.

According to the present invention, the articles to be coated are submerged in a bath of the coating material. For convenience of description the material is referred to in the specification and claims as lacquer but it is to be understood that the term lacquer is used in a general and comprehensive sense and is intended to include various forms of lacquer and analogous coating materials. While the articles to be coated may vary, the invention is particularly applicable to metal shell-like articles such as box parts.

After the articles have remained in the bath a sufficient period they are withdrawn from the bath at a rate of emergence that bears a definite ratio to the rate of gravitational flow or drain of the lacquer on the emerging articles, and according to the best practise the articles will be withdrawn at a rate of emergence that is substantially equal to the rate of lacquer flow. It has been found that when the articles are withdrawn too slowly, in proportion to the rate of lacquer flow, or, conversely, when the lacquer flows too rapidly for a given rate of emergence the portions of the articles first emerging do not have a proper coating as there is an excessive lacquer drainage or drag away from those portions. On the other hand, when the articles are withdrawn too rapidly in proportion to the rate of lacquer flow, or the lacquer flows too slowly for a given rate of emergence, the excess lacquer does not properly drain off, particularly at the portions of the articles last emerging. This results in thick spots that cause discoloration and other blemishes.

By withdrawing the articles as above described, these disadvantages are avoided. There is no excessive flow or sagging of the lacquer on the parts first emerging and the drainage of excess lacquer is sufficient to avoid thick spots. There is a clean break between the film and bath surface and retention of drops of lacquer at the points of the articles last emerging is avoided.

The relation between the rate of emergence and the lacquer flow may be maintained by varying the rate of emergence of the articles or the viscosity of the lacquer. The former may be regulated by varying the chain speed, the angle of the path of withdrawal, or the relative angular position of the articles in emerging. The viscosity of the bath may be regulated by controlling the temperature of the bath or by adding or subtracting thinning material to or from the bath.

In carrying out the invention in its entirety, the dipped articles are withdrawn while positioned at an angle to the horizontal and, immediately after withdrawal, while the lacquer is still unset, the position of the articles is reversed with respect to the horizontal, thereby to reverse the direction of the lacquer flow. According to what is now considered the best practise, the articles are rocked back and forth across the horizontal several times. This periodically reverses the direction of lacquer flow and spreads the lacquer in an even film during the period prior to setting of the lacquer. The articles are held at the end of each rocking movement a sufficient time to permit the lacquer to overcome inertia and start to reverse its flow. Since there may be some concentration of lacquer at the portions of the articles last emerging the articles may be held in the position opposite the position of emergence slightly longer than they are held in the position of emergence, in order to compensate for this concentration.

The articles are dried and the lacquer film given a final set by subjecting them to the action of heat. This is a step known in the art and needs no further description.

In carrying out the invention in its entirety, the articles, between the rocking or spreading operation and the final drying, are held in a horizontal position during what may be termed a preliminary setting period, i. e. a period in which the lacquer sets sufficiently to be non-fluent. By so holding the articles until the preliminary set is effected there is no danger of any creep in the film following the spreading operation, e. g. while the articles are being transported to a drying chamber.

In coating certain types of articles by dipping in a bath, namely, articles of a cup or shell shape, such as box parts, it often happens that a bubble of air is entrapped in the shell. For example, in dipping box parts this bubble of air is entrapped in the crevice between the body and rim of the box part. These air bubbles prevent access of the bath material to the spot where they occur and result in what are known as "dry spots" that mar the appearance of the finished article. In carrying out the method of the invention in its entirety the articles, while submerged in the bath, are shifted into a position to permit the escape of any entrapped air. The character of this movement will depend upon the nature of the article and its position of submergence. In any case, however, the article is moved into such a position that there is a free path for any air bubbles to flow upwardly to the surface of the bath. For example, when a box part or shell is submerged with its open face at an acute angle to the horizontal, a movement of the article to cause its open face to approach and slightly cross the vertical permits the escape of the entrapped air.

Referring to the drawings, in the embodiment illustrated as an example, supported by a main frame 21 is a housing 22 enclosing a dipping chamber 23 and a housing 24 enclosing a drying chamber 25, the two chambers being contiguous and having a common dividing wall. Near the bottom and outer end of the dipping chamber is a tank 26 for a lacquer bath, hereinafter referred to in more detail.

There is provided conveyor means for conveying the articles to be coated past the tank and to and through the drying chamber and this may conveniently be accomplished by an endless conveyor carrying article supports. As here shown as an example, the conveyor means comprises two parallel endless chains 32 moving as a unit. From one end of the top of the frame (the right end in Fig. 1) the chains take a downward and inward slant from duplicate guide sprockets 34 to guide sprockets 35 located adjacent the tank, where they enter the dipping chamber 23 through a suitable opening shown in Fig. 1. From sprockets 35 the chains pass obliquely upwardly to duplicate guide sprockets 36 and thence straight upwardly to duplicate sprockets 37, where they enter the drying chamber through a suitable opening in the dividing wall (Fig. 1). In the drying chamber the chains have a zig-zag course over duplicate guide sprockets 39, 40 and 41. From the latter, the chains leave the drying chamber, through a suitable opening shown in Fig. 1, and take an upward outward slant to duplicate guide sprockets 42 from where they have an idle return across the top of the frame, supported by tracks 33, to the starting point, i. e. sprockets 34.

The downward slant just in advance of the entrance to the dipping chamber provides a convenient loading station and the upward slant beyond the drying chamber an unloading station.

While the chains may be driven in any suitable manner, in the present exemplification, sprockets 37 are drive sprockets. On a shaft 45 on which sprockets 37 are mounted, is a worm gear 46 meshing with a worm 47 (Fig. 2) on a shaft 48. This shaft is driven by a worm gear 49 meshing with a worm 50 on a cross shaft 51. The latter is rotated by a pulley 52 driven by belt 53 from a motor 54. The driving means described gives the chains a relatively slow predetermined speed. While the movement is continuous, it is slow enough to enable the articles to be loaded and unloaded as the chains pass the loading and unloading stations.

Pivotally mounted on the conveyor means are article-supporting elements and in the best embodiments of the invention these elements will be removable. Although capable of various constructions, in that here shown as an example, extending between the chains at spaced intervals are a series of supporting racks and since these rack units are duplicates the description of one unit will suffice. Referring more particularly to Figs. 10–12, a hanger rod 60 has its ends mounted in opposite links of the chains to form part of the conveyor means. On the rod are spacer bushings 61 located between the chains and adjustably fixed collars 62. The article-supporting rack comprises a cross bar 63 and end pieces 64, the cross bar being secured to oblique lower edges of the end pieces. In the front edge of each end piece is an open-faced polydirectional slot 65 having at the top an arcuate bearing portion 66 for taking over the hanger rod 60. At the lower end, each end piece extends outwardly in the form of a lip 66ᵃ. When the rack is hung on the hanger rod, by means of the bearing 66, it is free to pivot thereon, end play being prevented by the fixed collars 62. This pivotal mounting permits the rack to keep, by gravity, a normal position as the chains travel through their tortuous path, and permits the rocking or tilting movements hereinafter referred to. The substantial normal position of the rack, which may vary slightly in different units, is shown in Fig. 7, Fig. 4 and the top unit of Fig. 3.

The construction described also permits the rack to be removed upon a polydirectional movement thereof with respect to the hanger rod. That is, the rack is first moved in a direction to enable the rod-receiving or bearing portions of the slots to clear the rod. Then, by a movement in a direction at an angle to the first movement, the rack is moved away from the rod, the rod passing through the open faces of the slots. Fig. 11 shows, in full lines, the normal position of the rack. The broken lines indicate the rack shifted upwardly and to the left so that the bearing portions of the slots can clear the rod. The rack is now free to be moved away from the rod by a left and slightly downwardly movement. It will be noted, however, that the rack cannot be removed without polydirectional movement because for no unidirectional movement will the bearing portions of the slots clear the rod. The rack is replaced, as will be apparent, by a reversal of the polydirectional movement described.

In connection with the removably and pivotally mounted supporting rack there is provided releasable means for normally preventing removal of the rack. With the type of rack above described this may be accomplished by normally preventing the initial removing movement of the rack, i. e. the movement of the bearing portions 66 of the slots away from the rods. In structures embodying the invention to what is now considered the best advantage, this movement is prevented by cooperating stop elements on the rack and conveyor, at least one being displaceable from stopping relation. Although capable of various constructions, in that here shown as an example, slidable on the rod 60 (Figs. 10–12) are two stop blocks in the form of round washers or collars 67. Extending upwardly from the cross bar 63 of the rack is a flange 68 having its upper edge formed with a central low point 69 and two end stop shoulders 70 (Fig. 10). In latching position the blocks 67 are located at or near the ends of the rod 60 and opposite the stop shoulders 70. A tendency of the rack to move in the initial direction above described brings the shoulders 70 and blocks 67 into engagement before such initial movement can be completed. Consequently, as long as the stop blocks are so located the rack cannot be removed. As the stop blocks 67 are symmetrical with respect to the hanger rod, the action is the same no matter in what angular position the rack may be located on its pivot. To enable the rack to be removed, the stop blocks 67 are slid inwardly along the rod until they are opposite the low portion 69 of the flange 68, as shown in the broken line position of Fig. 10. This portion is cut down far enough to permit the initial movement of the rack without engaging the stop blocks. The construction described provides an effective holding means for the racks and one that is quickly and readily released to permit removal of the racks, frequent removals being desirable for cleaning and other purposes.

There is provided means for firmly supporting the articles on the racks and in a manner to permit ready loading and unloading. This may be accomplished by a plurality of article-engaging fingers the tips of which are located in more than one straight line, at least one finger being movable and having a spring tending to press it into article-engaging position. The embodiment here illustrated is designed for the coating of articles of the type which may be termed shells, that is, articles having a body portion and a rim or side wall. The particular articles here shown are round box parts, e. g. the upper or lower half of a round brass box. In coating such articles, the shells may be supported by hangers consisting of three fingers, the tips of which take into the corner or crevice formed between the shell body and rim.

Although capable of various constructions, in that here shown as an example, each rack carries a plurality of hanger units. As these units are duplicates the description of one unit will suffice. Removably secured to the crossbar 63 by bolts 71 is a spaced plate 72. Clamped against the crossbar by plate 72 is the looped end of a double pronged wire 73. Both prongs are bent downwardly at a substantial right angle. At the bottom, the ends of the prongs are bent upwardly at an obtuse angle, but in opposite directions (Figs. 10-11), to form two fixed fingers 74. Co-operating with the two fixed fingers 74 is a movable finger 75. This is formed by a wire 76 which has a straight portion slidable in a thimble 77 secured in a hole in plate 72 by having its rim turned down thereagainst and extending through a suitable hole in the crossbar 63. Beyond the thimble the wire 77 is bent outwardly and then downwardly (Fig. 11) and at the outer end is bent sharply upwardly to form the finger 75. All three of the fingers have pointed tips to take into the crevice between the bottom and rim of the shell 80, and the tips lie in the circumference of a circle, providing a three-point support for the box. On the wire 77 of the movable finger is an abutment nut 78 and between this nut and plate 72 is a coiled spring 79. This spring tends to pull movable finger 75 away from the other two, the movement being limited by the bend in the wire (Fig. 11).

To load a shell onto a hanger unit, the movable finger is moved inwardly against the spring toward the other fingers, until a shell can span the three finger tips and hook over the same. This may be done by hooking the shell rim over finger 75 and pulling down thereon until the opposite side of the rim can take over the fingers 74, or by pressing down on nut 78 to move the finger 75 to loading position. When the parts are released, spring 79 pulls the movable finger into article-supporting position. That is, in the present instance, the spring tends to pull the movable finger away from the other two, thus firmly holding the shell on the hanger.

In the embodiment illustrated the fingers are so arranged that, in the normal position of the rack (Fig. 11) the shell is positioned to have an interior angle of approximately 50° to the horizontal. And as the racks pivot by gravity to hang in normal position, except when shifted, as elsewhere described, the shell normally has this angular position during the course of its travel.

In the embodiment illustrated, each finger of the hanger unit has a diameter gradually decreasing toward the tip. This taper provides a hanger construction of suitable strength but with a minimum surface area, and so reduces to a minimum the amount of lacquer applied to the fingers and which is, of course, wasted.

In the embodiment illustrated, moreover, each finger wire has a downwardly pointing bend or angle adjacent its tip. With this construction the lacquer can readily drain off from the lowest points of the wires and from the inside of the shell.

The hanger construction described is such that disassembly for cleaning, repairs or the like, is readily accomplished.

As above mentioned, the downward slant of the conveyor chains as they approach the dipping chamber, conveniently constitutes a loading station where the shells may be hung on the supporting fingers. There is provided means for holding the racks against any substantial pivotal movement as they pass the loading station and in structures embodying the invention to the best advantage the racks are first moved on their pivots to swing the fingers outwardly toward the loading operator and then held in that relative position. Although capable of various constructions, in that here shown as an example, inside each chain, and parallel thereto, at the loading station, is a cam bar 82 the inner edge of which engages a cam rider in the form of a pin 83 extending outwardly from the end piece 64 of the rack. During the travel of the cam rider 83 down the cam bar the rack is in a position approaching the horizontal with the fingers swung outwardly. In this position, which is illustrated in the two lower units of Fig. 3, the fingers are accessible to the loading operator. Moreover, the cam holds the rack in this position against any substantial pivotal movement. This prevents any undue wobbling of the article supports under the manipulation of the loading operation.

To insure the proper engagement of pins 83 with the cam bars 82 there is provided means for giving the racks a preliminary tilt into the loading position described. As here shown as an example, opposite the entrance end of each cam 82 and outside the chain, is a cam block 81 having its camming end located in the path of the edge of lip 66ª of the rack end piece. As the rack moves downwardly in normal position, exemplified by the top unit in Fig. 3, lips 66ª engage the camming edges of cams 81 and ride over the same. By this engagement the racks are tilted to the position described and by the time the lips 66ª have rounded the high point of the cams 81, as exemplified by the middle unit of Fig. 3, the pins 83 are in a position to be taken by cam bars 82. The cam 82 extends far enough to give the attendant or attendants time to load the various hanger units and terminates far enough short of the entrance to the dipping chamber to permit the rack to return to normal position before reaching the tank.

There is provided means for preventing undue wobble or slack in the conveyor chains on their passage past the loading station. This may conveniently be accomplished by applying a braking action to the chains slightly in advance of the loading station. As here shown as an example (Figs. 1 and 17) the sprockets 34 are mounted on shafts 157 journaled in bearings 158. Also mounted on each shaft is a brake drum 159 on which is an adjustable brake band 160 under slight tension. This braking action does not seriously interfere with the travel of the chain but it prevents any undue slack or pulling of the chain under the manipulation of the loading operation.

As shown in Fig. 1, in the present embodiment, the tank 26 is located just inside the opening by which the racks enter the dipping chamber, the front end of the tank, which has a slanting entrance wall (Figs. 1 and 4), being below the near side of the sprockets 35. The tank is so located that as the racks move down around sprockets 35 the shells 80 are submerged in the lacquer bath contained in the tank. As will be apparent from Fig. 4, due to the normal position of the shell supports, the shells enter the bath edgewise and with a minimum resistance.

There is provided means for maintaining a substantially constant bath level and this may, for example, be accomplished automatically by an air pressure balance. Although capable of various constructions, in that here illustrated, outside the housing 22 is an adjustable bracket 86 (Figs. 13-14) having oppositely disposed shelves or ledges 87. Lacquer is supplied from a container which may conveniently be an inverted bottle 88. On the neck of the bottle is a collar 89 having a rectangular platform or support 90 which is suspended on the shelves 87. The bottle unit is held in place by set screw catches 91. The collar 89 has a vertical chamber 92 normally closed by a cap 93 and registering with the bottle mouth. Leading out from chamber 92 is a transverse bore 94 communicating with a bent pipe 95, the far end of which, when the bottle is in place, extends into an extension 96 of the tank. When a bottle has been filled, the stopper cap 93 is screwed on, the bottle unit inverted, the pipe 95 inserted through a suitable opening in the wall of the housing, and the platform 90 suspended on ledges 87 and secured by catches 91. Fig. 13 shows the lacquer level in the tank at the mouth of feed pipe 95. When the level falls below the mouth, air enters pipe 95 and passes up through the lacquer to the space in the bottle above the lacquer contained therein. This allows lacquer to flow out of the bottle into the tank until the bath level rises again far enough to shut off the end of pipe 95, whereupon the flow ceases. In this manner there is maintained a substantially constant bath level in the tank. With the construction described, moreover, the supply is maintained in a manner that is easily handled, that is handled from outside the housing, and that does not require the maintenance of a large supply. A number of duplicate bottle units may be provided and when one bottle is empty a duplicate filled unit may be immediately substituted. It is to be understood that at the start of a run, the tank being empty, the tank may be filled initially in any suitable manner.

The tank has a bottom pipe 97, normally closed, for drainage purposes when it is desired to empty the tank. The end wall of the housing 22 below the entrance opening is hinged at 98 (Fig. 1) and may be swung out of the way to permit a cover to be placed on the tank during brief shutdowns.

To avoid an unnecessary amount of lacquer in the tank, the tank has a false bottom 99 substantially parallel to the slant of the chains.

When shell-like articles, such as the box parts here shown, are submerged there is ordinarily a small bubble of air entrapped at the top of the shell at the crevice between the bottom and rim. This air bubble, unless eliminated, results in a so-called "dry spot" that mars the appearance of the finished product. The invention in its entirety includes means for causing a release of this entrapped air to eliminate such dry spots. This may be accomplished, for example, by shifting the position of the shell while in the bath to permit the air to escape from the crevice where it is entrapped. Although capable of various constructions, in that here shown as an example, below one of the sprockets 35, and a short distance inside the entrance end of the tank, is a cam track 101. This cam engages lugs 102 on the lips 66ª of the rack end pieces. The cam is so arranged that by its engagement with lug 102, the rack is tilted on its pivot to swing the supported shell backwards to a substantially vertical or past-vertical position. Fig. 4 shows a unit just approaching the cam 101. Fig. 5 shows a unit being tilted and approaching air-releasing position. As the rack continues its travel the lug 102 rides off cam 101 and the rack swings back to normal position. This tilting or flip of the shells in the bath permits any entrapped air to escape from the shells and pass out through the bath to the surface. As a result the dry spots referred to are eliminated.

As the rack leaves sprockets 35 and travels up the slant toward sprockets 36, the shells are withdrawn from the bath and the rate of emergence is regulable in order that it may be made to accord with the rate of lacquer flow, as above described. The rate of emergence may be changed by changing the speed of the chains; by changing the slant thereof; or by changing the supports to vary the angular position of the shells. As the shells emerge the excess lacquer drains off leaving a coating or film. This film, being still fluent, tends to flow by gravity downward on the faces of the shells. If the lacquer were permitted to set in this condition an uneven coating might result. The invention in its entirety includes means for causing the position of the withdrawn articles to be reversed with respect to the horizontal, thereby to reverse the gravitational flow of the lacquer film, and in constructions embodying the invention to the best advantage the articles are rocked back and forth across the horizontal to periodically reverse the lacquer flow while the lacquer retains substantial fluency. While this reversing may be accomplished in various ways, it may conveniently be done by rocking a supporting rack, such as that described, on its pivot in such a manner as to rock the shells across the horizontal. Although capable of various constructions, in that here shown as an example, paralleling the path of each conveyor chain on its upward slant from the tank is a cam bar 110. Each cam bar 110 has a recurrent series of high cam curves 111 facing the tank and positioned to engage the approaching cam rider pins 83 on the rack end pieces. As the cam riders 83 engage the first high cam surfaces 111 the cams cause the rack to swing around on its pivot until the shells have reversed their position with respect to the horizontal. That is, the shells are turned end for end so that the points formerly at the bottom are now at the top. This position is illustrated in Fig. 6. Owing to this reversal the gravitational flow of the lacquer is now in the opposite direction and thus the lacquer is spread in an even film.

Beyond the high curves 111 each cam bar has a recurrent series of low cam curves 112. After leaving the first high curves 111 the cam riders 83 ride down the subsequent low curves 112, being held to the cams by the gravity swing of the rack, and the rack is returned to substantially its former position. This swings the shells back across the horizontal to substantially the position of emergence (Fig. 7) thus again reversing the gravitational flow of the lacquer film. It will now be apparent that this rocking of the rack is repeated for each unit of the recurrent series.

There is provided means for holding the shells between rocking movements and in carrying out the invention to what is now considered the best advantage the shells are held a longer interval in the position opposite the position of emergence. Although capable of various constructions, in that here shown as an example, between the high cam curves 111 and the low or return curves 112, are high flats 113 over which the pins 83 ride after attaining the crests of the high curves. These flats hold the racks in displaced position a given interval which is sufficient to allow the lacquer film to overcome inertia and start to reverse its flow. In the present embodiment, with a chain speed of about two feet per minute, the high flats hold the shells reversed for approximately two seconds. Between each low or return cam curve and the next high curve are low flats 114 whereby the shells are held in the position of emergence a given interval again to give time for the lacquer film to reverse its flow. In the present embodiment the low flats 114 are slightly shorter than the high flats 113 so that the shells are held in the position of emergence slightly less than two seconds. When the shells emerge from the bath there is a slight concentration of lacquer on the lower part of the shells. To equalize the film and compensate for this condition, the shells are held longer in the position to permit more flow away from the points of concentration. The periods of holding may be controlled by substituting cam bars having flats of different lengths.

As a given rack progresses the shells are periodically rocked through recurrent cycles duplicating the one described. The rocking is preferably continued until the lacquer film has set sufficiently to have no substantial fluency. In the present embodiment the cam bars have six units.

With the construction described the lacquer film is evenly spread over the faces of the shells and results in an even coating.

In order to prevent sagging of the chains and to position the cam riders 83 properly, paralleling the cam bars 110 are supporting tracks 115 on which the chains ride.

From the end of the rocking cams the chains pass up around the sprockets 36 and take an upward vertical path to the entrance of the drying chamber. While the lacquer film has no substantial fluency by the time the rocking operations are completed, in order to prevent any change of creep of the film during what may be termed the preliminary setting period, there is provided means for holding the shells in a horizontal position during their travel from the rocking station to the drying chamber. This may be accomplished by cam means for engaging part of the rack to so tilt the same that the shells have horizontal position.

As here shown as an example, beyond the final low points 112 the cam bars 110 have cam curves 117 which are engaged by the cam riders 83. By this engagement a rack is tipped sufficiently to swing the supported shells upwardly into a substantially horizontal position. Beyond each cam curve 117 is a high flat 118 for holding the rack in this tilted position. This flat extends (Fig. 15) to a point about below the axis of sprocket 36 where the cam riders are taken by a curved bar spring 119. These cam springs 119 are, in effect, continuations of flats 118 and are made in spring form to be yieldable in case of a jam.

Since the holding cam track formed by the end of bar 110 and spring extension 119 engages the outer portions of cam riders 83, it cannot function beyond a certain point in the upward curve because it ceases to take hold. There is provided a second cam track 120 paralleling and offset from the first cam track so as to engage the cam riders 83 from within, i. e. it is between the cam riders and the rack pivot. This cam is arranged to take hold before the first one lets go so that the racks are maintained in their tilted position.

In order to effect transfer from one cam to another without jar or the like and to avoid the necessity of providing exact overlap between the two cams, there is provided a movable extension on cam 120 with a spring tending to hold it in a slightly overthrown position. Although capable of various constructions, in that here shown as an example, pivoted to cam element 120 is a cam extension 121 (Figs. 15, 16) extending inwardly and downwardly to overlap cam element 119. On the extension 121 is a pin 122 to which is connected a spring 123. The other end of this spring is anchored to a pin 124. The spring tends to draw the cam extension toward cam element 119 and permits movement in the opposite direction. Movement in either direction is limited by the ends of a slot 126 in a bracket 127 and in which pin 122 rides.

In normal position (Fig. 15) the spring pulls the extension 121 far enough toward cam element 119 to be beyond the position for taking the cam riders, i. e. it is slightly overthrown. The extension overlaps cam element 119 sufficiently to take hold before the latter lets go. As a rack travels around pulleys 36, the cam extensions 122 are engaged by cam riders 83 and are displaced against their springs into a position where they become, in effect, continuations of cams 121. With this construction the inner cams take hold before the outer cams let go and the transfer is effected without jar.

At sprockets 37 the chains enter the drying chamber and take the zig-zag course above described. This gives plenty of time for the lacquer to dry and finally set.

There is provided means for heating the drying chamber and temperature controlled means for regulating the heat supply to maintain a substantially constant temperature. Although capable of various constructions, in that here shown as an example, in the drying chamber are a number of steam pipe heating units 131. Each unit comprises a series of reverse bends transverse the chamber. Steam is supplied by a main 132 to which the units are suitably connected. The units are similarly connected to an exhaust main 133. In the live steam main 132 is a U-shaped connection 134 in which is a steam control valve 135 automatically operated in accordance with the temperature of the drying chamber. To this end, as here illustrated, connected to the stem 136 of valve 135 is a valve lever 137 the free end of which is connected to a chain 138 running over pulleys 139, 140 and having its ends connected to cranks 141, 142 on a motor 143. The latter has a three wire connection with a thermostat 144, the thermometer bulb 145 of which extends into the drying chamber.

The thermostat device and motor operated valve above referred to are, in themselves, well known elements and no detailed description is necessary.

When the temperature of the drying chamber exceeds a given degree, fixed by the setting of the thermostat, a circuit is closed to cause the motor to operate in a manner to cause the chain 138 to depress lever 137 and close valve 135, thus shutting off the steam. When the temperature of the drying chamber falls below the critical point another circuit is closed to cause a reverse action to open valve 135 and admit steam.

A by-pass 146 extends across the U-shaped connection 134 and in the by-pass is a hand valve 147 for controlling the steam supply by hand if desired.

There is provided means for controlling the temperature of the bath and this may be accomplished by controlling the temperature of the dipping chamber. In the exemplification illustrated the dipping chamber is heated from the relatively hotter drying chamber and a certain amount of cool air enters the conveyor entrance. In the upper wall or roof of the drying chamber are adjustable dampers 160, 161. By opening these dampers to a greater or less extent the temperature of the drying chamber may be reduced accordingly and by closing them it may be raised.

As a rack passes up around sprockets 41 it leaves the drying chamber and takes the upward slant above referred to, which forms an unloading station. While the rack is passing up this slant an attendant removes the finished shells. This may be accomplished conveniently by pushing the movable hanger finger 75 inwardly. This causes the movable finger to approach the other two so that the box shell is free to be lifted off.

There is provided means for preventing any substantial pivotal movement of the article-supporting rack as it passes the loading station and in structures embodying the invention to what is now considered the best example the rack is tilted into convenient unloading position and then held in that position. Although capable of various constructions, in that here shown as an example, paralleling the greater portion of the path of the conveyor between the exit from the drying chamber and sprockets 42 are duplicate cam bars 150, one for each side, located inside the chains (Figs. 1 and 9). Each cam bar 150 has a tilting entrance portion 151 and a flat portion 152 paralleling the chain. As a rack approaches cam elements 150, the cam riders 83 ride up the slants 151 of the cams and the racks are tilted in a manner to swing the supported articles inwardly to a nearly vertical position. This movement of the rack swings the ends of finger wires 76 into an accessible position for the attendant and swings the shells into a convenient position for removal. As the rack travels upwardly the cam riders 83 travel along the flats 152 of the cam elements 150 and these flats hold the racks from swinging back to normal position. To prevent any substantial pivotal movement of the rack in the opposite direction, opposite each cam element 150 is a parallel cam track 153. This is so spaced from cam 150 as to engage cam rider 83 upon a tendency of the rack to tip further away from normal position. Thus the racks are held against any substantial pivotal play under the manipulation of the unloader.

After leaving the unloading station the chains and supports pass idly across the top of the frame (Fig. 1) to the starting point, i. e. sprockets 34.

While the operation of the apparatus will be clear from the above description, to review the same: the chains moving as described, a given rack passes downwardly from sprockets 34 past the loading station. Cam elements 81 engage the edges of lips 66ª on the rack end pieces and tilt the rack to swing the hanger fingers outwardly (Fig. 3) to be accessible to the operator. This places cam riders 83 in a position to be taken by cams 82 which hold the racks against wobbling. While the rack is passing the loading station, the shells are hung on the hanger fingers as above described. When the cam rider pins 83 leave cams 82 the rack swings back to normal position and passing down around sprockets 35, enters the dipping chamber. Here the supported shells are submerged in the bath and then withdrawn therefrom at a rate of emergence substantially equal to the rate of lacquer flow on the emerging shells. The rate of emergence is fixed by the chain speed, the angle of its path, and the angular position of the shells. In the apparatus shown the shells are positioned at an angle of about 50° to the horizontal; the path of the chains in leaving the tank is at an angle of about 10° to the horizontal and a convenient chain speed is about two feet per minute. This gives a certain rate of emergence and the viscosity of the bath is regulated to give a corresponding rate of flow.

While the rate of emergence may be regulated, to accord with different lacquers, by varying one or more of the factors above mentioned, for a given apparatus it is considered more practicable to regulate the rate of lacquer flow. The bath may be thinned or thickened by adding or subtracting any suitable thinning material and the temperature may be regulated as above described. Since the temperature of the drying chamber is maintained substantially constant, the dipping chamber and bath temperatures will remain substantially constant under constant exterior conditions. Upon a change in exterior conditions, e. g. in room temperature, the dampers 160, 161 are operated to maintain the proper temperature of the dipping chamber. A dipping chamber temperature to give a bath temperature of about 80° F. has been found suitable.

As the rack leaves the tank it is rocked by cams 110, as above described, to rock the shells back and forth across the horizontal, thus spreading the still fluent lacquer in an even film. Then the rack is tilted by cam curves 117 into a position such that the shells are substantially horizontal and is held in this position by cam elements 118, 119, 120. The rack, in this position, is conveyed up around sprockets 36 and upward to the entrance to the drying chamber. The position described prevents any creep of the lacquer film on the faces of the shells during the preliminary setting period and aids in the setting by moving the outer faces of the shells face-on toward the hot air from the drying chamber.

At sprockets 37, the rack enters the drying chamber and takes a zig-zag course through the same. By the resulting heat treatment the shells are dried and the lacquer film is finally set. Leaving the drying chamber, the rack passes upwardly past the unloading station. Cam slants 151 tilt the rack, as described, into accessible position and cams 150, 153 hold it in this position to enable unloading of the shells without undue wobbling of the rack. The rack now passes idly across the top of the frame to the starting point.

It will be understood that the chains carry a considerable number of duplicate rack units and that the operation is the same for each successive unit. To simplify the illustration only a few of the units have been shown. In Fig. 1 only one unit is indicated. In Fig. 2 several units are indicated but only the racks themselves are shown, the fingers and associate parts being removed from cross bars 63 for convenience of illustration. In Figs. 3, 4, 8 and 9, while only a few units are shown in full, these figures indicate the spaced hanger rods 60, it being understood that each hanger rod carries a rack unit.

The apparatus described makes possible a product having an even, uniform coating and at the same time the coating may be accomplished at such a speed as to make possible quantity production that is commercially economical.

What we claim is:

1. In an apparatus of the class described, and in combination, a tank for a lacquer bath, supporting means for a shell, conveyor means on which the supporting means is pivotally mounted, for conveying the supporting means past the tank to cause the shell to be submerged in the bath, a cam-engaging element on the supporting means, and a cam adjacent the tank for engagement by said element for causing the supporting means to tilt, thereby to tilt the shell while in the bath and permit the escape of any entrapped air.

2. In an apparatus of the class described, and in combination, a tank for a lacquer bath, a drying chamber, article supporting means, conveyor means, on which the supporting means is freely pivoted, for conveying the supporting means past the tank and through the drying chamber, and means for preventing pivotal movement of the supporting means for a portion of its path beyond the drying chamber, thereby to steady the supporting means for unloading.

3. In an apparatus of the class described, and in combination, a tank for a lacquer bath, article supporting means, conveyor means, on which the supporting means is freely pivoted, for conveying the supporting means past the tank, whereby the articles are submerged in the bath, a cam-engaging element on the supporting means, and a flat cam track paralleling a portion of the path of the supporting means for engagement by said element to hold the supporting means against pivotal movement.

4. In an apparatus of the class described, and in combination, a tank for a lacquer bath, an endless conveyor having a portion of its path extending downwardly toward said tank, a rack pivotally mounted on the conveyor, article supporting fingers on the rack, and means adjacent said portion of the path of the conveyor for tilting the rack so as to swing the supporting fingers outwardly.

5. In an apparatus of the class described, and in combination, a tank for a lacquer bath, an endless conveyor having a portion of its path extending downwardly toward said tank, a rack pivotally mounted on the conveyor, article supporting fingers on the rack, and means adjacent said portion of the conveyor path for tilting the rack so as to swing the supporting fingers outwardly and hold them in such position during part of the travel of the conveyor through said portion of its path.

6. In an apparatus of the class described, and in combination, a tank for a lacquer bath, an endless conveyor having a portion of its path extending downwardly toward said tank, a rack pivotally mounted on the conveyor, article supporting fingers on the rack, and cam means adjacent said portion of the path of the conveyor for tilting the rack so as to swing the supporting fingers outwardly and hold them in such position during part of the travel of the conveyor through said portion of the path.

7. In an apparatus of the class described, and in combination, a tank for a lacquer bath, an endless conveyor having a portion of its path extending downwardly toward said tank, a rack pivotally mounted on the conveyor, article supporting fingers on the rack, a cam engaging element on the rack, a flat cam track paralleling said portion of the path of the conveyor for engagement by said element to hold the rack against pivotal movement, and a cam for engagement by part of the rack to tilt the rack to move said element into a position to engage said cam track.

8. In an apparatus of the class described, and in combination, a supporting framework, a tank for a lacquer bath located near the bottom of the framework, a drying chamber, two parallel endless conveyor chains, sprockets for guiding the conveyor chains from the tank to and through the drying chamber, thence on an upward slant to the top of the framework, thence across the top of the framework and thence on a downward slant to the tank, racks pivotally mounted between the conveyor chains, article supporting fingers on the racks, and means for tilting the racks to swing the supporting fingers outwardly and hold them in such position during a portion of their travel on said downward slant.

9. In an apparatus of the class described, and in combination, a supporting framework, a tank for a lacquer bath located near the bottom of the framework, a drying chamber, two parallel endless conveyor chains, sprockets for guiding the conveyor chains from the tank to and through the drying chamber, thence on an upward slant to the top of the framework, thence across the top of the framework and thence on a downward slant to the tank, racks pivotally mounted between the conveyor chains, article supporting fingers on the racks, means for tilting the racks to swing the supporting fingers outwardly and hold them firmly in such position during a portion of their travel on said downward slant, and means for tilting the racks to swing the supporting fingers inwardly and hold them firmly in such position during a portion of their travel on said upward slant.

10. In an apparatus of the class described, and in combination, a tank for a lacquer bath, a drying chamber, an endless conveyor having a portion of its path extending upwardly and outwardly from the lower part of said drying chamber, racks pivotally mounted on said conveyor, article supporting fingers on the racks, cam-engaging elements on said racks, and two spaced cam tracks paralleling said portion of the path of the conveyor between which cam tracks said elements travel, whereby the rack is held against any substantial pivotal movement.

11. In an apparatus of the class described, and in combination, housings enclosing adjacent dipping and drying chambers, heating means in the drying chamber, the dipping chamber being heated thereby, a tank in the dipping chamber for a lacquer bath, conveyor means for conveying articles into and through the two chambers, the housings having openings for the passage of the conveyor means, temperature-controlled means for regulating said heating means, thereby to maintain a substantially constant temperature in the drying chamber, and means for regulating the temperature of the dipping chamber.

12. In an apparatus of the class described, and in combination, housings enclosing adjacent dipping and drying chambers, heating means in the drying chamber, the dipping chamber being heated thereby, a tank in the dipping chamber for a lacquer bath, conveyor means for conveying articles into and through the two chambers, the housings having openings for the passage of the conveyor means, temperature-controlled means for regulating said heating means, thereby to maintain a substantially constant temperature in the drying chamber, and an adjustable damper in the dipping chamber housing for regulating the temperature of the dipping chamber.

13. In an apparatus of the class described, and in combination, a housing enclosing a dipping chamber, a tank in said chamber for a lacquer bath, conveyor means for conveying articles into and through the dipping chamber, the housing having openings for the passage of the conveyor means, means for supplying heat to the dipping chamber, and an adjustable damper in the upper part of the housing for regulating the temperature of the chamber.

14. In an apparatus of the class described, and in combination, a tank for a lacquer bath, conveyor means moving past said tank and including pivotal cross bars, article-supporting racks, means whereby the racks may be pivotally and removably hung on said cross bars, and releasable means for normally preventing removal of the racks.

15. In an apparatus of the class described, and in combination, a tank for a lacquer bath, endless conveyor means moving past said tank and including pivot cross bars, article-supporting racks including slotted end plates hung on said cross bars to pivot thereon, and releasable latch means for normally holding said racks against removal of the cross bars in any pivotal position of the racks.

16. In an apparatus of the class described, and in combination, a tank for a lacquer bath, conveyor means movable past the tank and including a hanger rod, an article supporting rack comprising a crossbar and end pieces, said end pieces having open-faced polydirectional slots having portions for receiving said rod, whereby the rack is pivotally mounted on the rod and is removable therefrom upon a polydirectional movement of the rack, and releasable means for normally preventing at least part of such movement.

17. In an apparatus of the class described, and in combination, a tank for a lacquer bath, conveyor means movable past the tank and including a hanger rod, an article supporting rack comprising a crossbar and end pieces, said end pieces having open-faced polydirectional slots having portions for receiving said rod, whereby the rack is pivotally mounted on the rod and is removable therefrom upon a polydirectional movement of the rack, and releasable means for normally preventing that part of such polydirectional movement which separates the rod-receiving portions of the slots from the rod.

18. In an apparatus of the class described, and in combination, a tank for a lacquer bath, conveyor means movable past the tank and including a hanger rod, an article supporting rack comprising a crossbar and end pieces, said end pieces having open-faced polydirectional slots having portions for receiving said rod, whereby the rack is pivotally mounted on the rod and is removable therefrom upon a polydirectional movement of the rack, and a displaceable stop element for normally preventing that part of such polydirectional movement which separates the rod-receiving portions of the slots from the rod.

19. In an apparatus of the class described, and in combination, a tank for a lacquer bath, conveyor means movable past the tank and including a hanger rod, an article supporting rack comprising a crossbar and end pieces, said end pieces having open faced polydirectional slots having portions for receiving said rod, whereby the rack is pivotally mounted on the rod and is removable therefrom upon a polydirectional movement of the rack, and coacting stop elements on the rod and rack for normally preventing that part of such polydirectional movement which separates the rod-receiving portions of the slots from the rod, one of said stop elements being displaceable out of stopping position to permit such movement.

20. In an apparatus of the class described, and in combination, a tank for a lacquer bath, conveyor means movable past the tank and including a hanger rod, an article supporting rack comprising a crossbar and end pieces, said end pieces having open faced polydirectional slots having portions for receiving said rod, whereby the rack is pivotally mounted on the rod and is removable therefrom upon a polydirectional movement of the rack, a stop shoulder on the rack shorter in length than the hanger rod, and a stop block slidable on the rod to be movable into and out of position opposite said shoulder, the stop shoulder and stop block when opposite each other abutting to prevent the initial portion of such polydirectional movement.

21. In an apparatus of the class described, and in combination, a tank for a lacquer bath, conveyor means movable past the tank and including a hanger rod, an article supporting rack comprising a crossbar and end pieces, said end pieces having open faced polydirectional slots having portions for receiving said rod, whereby the rack is pivotally mounted on the rod and is removable therefrom upon a polydirectional movement of the rack, a stop shoulder on the rack shorter in length than the hanger rod, and a stop block slidable on the rod to be movable into and out of position opposite said shoulder, the stop shoulder and stop block when opposite each other abutting to prevent the initial portion of said polydirectional movement, said stop block being concentric with the pivotal axis of the rack, whereby it is capacitated to function in all angular positions of the rack.

22. In an apparatus of the class described, and in combination, a tank for a lacquer bath, means for causing articles to be submerged in the bath and withdrawn therefrom, and means for causing the withdrawn articles after complete withdrawal from the bath to be rocked back and forth across the horizontal to reverse periodically the gravitational flow of the lacquer, thereby to spread the setting lacquer into an even film.

23. In an apparatus of the class described, and in combination, a tank for a lacquer bath, means for causing articles to be submerged in the bath and withdrawn therefrom, and means for causing the withdrawn articles after complete withdrawal from the bath to be rocked back and forth across the horizontal and for holding them for a predetermined interval between rocking movements.

24. In an apparatus of the class described, and in combination, a tank for a lacquer bath, a support for the articles, means for moving the support to cause the supported articles to be submerged in the bath and withdrawn therefrom, and means for moving the support to rock the withdrawn articles after complete withdrawal from the bath back and forth across the horizontal, thereby to spread the setting lacquer into an even film.

25. In an apparatus of the class described, and in combination, a tank for a lacquer bath, a support for the articles arranged to carry the articles normally at an inclination to the horizontal, means for conveying the support past the tank to cause the articles to be submerged in the bath and withdrawn therefrom, and means for moving the support to rock the articles back and forth across the horizontal and for holding the articles, between rocking movements, in the relative position of emergence a given interval of time and in the opposite position a longer interval of time.

26. In an apparatus of the class described, and in combination, a tank for a lacquer bath, an article supporting rack, conveyor means for conveying the rack past the tank to cause the articles to be submerged in the bath and withdrawn therefrom, on which conveyor means the rack is pivotally mounted, and means for rocking the rack back and forth on its pivot during its movement away from said tank to rock the supported articles after complete withdrawal from the bath back and forth across the horizontal.

27. In an apparatus of the class described, and in combination, a tank for a lacquer bath, a drying chamber, an article-supporting rack, conveyor means on which the rack is pivotally mounted to hang in a normal position by gravity, means for guiding the conveyor means past the tank in a path to cause the supported articles to be submerged in the bath and withdrawn therefrom, and to be conveyed to and through the drying chambers, and means between the tank and the drying chamber for rocking the rack on its pivot to rock the supported articles back and forth across the horizontal.

28. In an apparatus of the class described, and in combination, a tank for a lacquer bath, an article supporting rack, conveyor means, on which the rack is pivotally mounted, for conveying the rack past the tank to cause the supported articles to be submerged in the bath and withdrawn therefrom, a cam rider on the rack, and a cam located beyond the tank for engagement by said cam rider to tilt the rack on its pivot, thereby to reverse the position of the withdrawn articles with respect to the horizontal.

29. In an apparatus of the class described, and in combination, a tank for a lacquer bath, an article supporting rack, conveyor means, on which the rack is pivotally mounted, for conveying the rack past the tank to cause the supported articles to be submerged in the bath and withdrawn therefrom, a cam rider on the rack, and a cam located beyond the tank and having a recurrent series of successive high and low portions for engagement by said rider to cause the rack to be rocked on its pivot, thereby to rock the supported articles back and forth across the horizontal.

30. In an apparatus of the class described, and in combination, a tank for lacquer bath, an article supporting rack, conveyor means, on which the rack is pivotally mounted, for conveying the rack past the tank to cause the supported articles to be submerged in the bath and withdrawn therefrom, a cam rider on the rack, and a cam located beyond the tank and having a recurrent series of successive high and low portions for engagement by said rider to cause the rack to be rocked on its pivot, thereby to rock the supported articles back and forth across the horizontal, said cam having flats beyond the respective high and low portions for holding the rack in extreme positions during predetermined intervals.

31. In an apparatus of the class described, and in combination, a tank for a lacquer bath, an article supporting rack, conveyor means, on which the rack is pivotally mounted, for conveying the rack past the tank to cause the supported articles to be submerged in the bath and withdrawn therefrom, a cam rider on the rack, and a cam located beyond the tank and having a recurrent series of successive high and low portions for engagement by said rider to cause the rack to be rocked on its pivot, thereby to rock the supported articles back and forth across the horizontal, said cam having flats beyond the respective high and low portions for holding the rack in extreme positions during predetermined intervals, the low flats being longer than the high flats, whereby the articles are held in the position of emergence a longer interval than in the reversed position.

32. In an apparatus of the class described, and in combination, a tank for a lacquer bath, a drying chamber, article-supporting means, for normally holding the articles at an angle to the horizontal, a conveyor, on which the supporting means is pivotally mounted, for conveying the support past the tank to cause the supported articles to be submerged in the bath, and thence to the drying chamber, and means for tilting the supporting means, during its travel from the tank to the drying chamber, to reverse the position of the articles with respect to the horizontal.

33. In an apparatus of the class described, and in combination, a tank for a lacquer bath, a drying chamber, article-supporting means for normally holding the articles at an angle to the horizontal, a conveyor, on which the supporting means is pivotally mounted, for conveying the support past the tank to cause the supported articles to be submerged in the bath, and thence to the drying chamber, means for tilting the supporting means, during its travel from the tank to the drying chamber, to reverse the position of the articles with respect to the horizontal, and means for subsequently tilting the supporting means to hold the articles in a horizontal position during the remainder of their travel to the drying chamber.

34. In an apparatus of the class described, and in combination, a tank for a lacquer bath, a drying chamber, article-supporting means for normally holding the articles at an angle to the horizontal, a conveyor, on which the supporting means is pivotally mounted, for conveying the support past the tank to cause the supported articles to be submerged in the bath, and thence to the drying chamber, and means for holding the supporting means tilted to cause the articles to have a horizontal position during at least a portion of the travel from the tank to the drying chamber.

35. In an apparatus of the class described, and in combination, a tank for a lacquer bath, a drying chamber, an article-supporting rack for normally holding the articles at an angle to the horizontal, a conveyor on which the rack is pivotally mounted, for conveying the rack past the tank, and thence to the drying chamber, a cam rider on the rack, cam means beyond the tank for engaging the cam rider to rock the rack to cause the articles to be rocked back and forth across the horizontal during a portion of their travel from the tank, and further cam means between said first named cam means and the drying chamber for engaging the cam rider to hold the rack in such a position that the articles are held in a horizontal position during their travel toward the drying chamber subsequent to the rocking operation.

36. In an apparatus of the class described, and in combination, a supporting framework, a dipping tank located adjacent one end of the framework, a pair of endless chains having cross rods capacitated to receive article-supporting racks, sprockets over which the chain runs and positioned to give the chains a downward path toward the tank and an upward slant away from the tank, other sprockets positioned to give the chains an up and down zig-zag course from said upward slant to the opposite end of said framework, and means for driving the chains.

37. In an apparatus of the class described, and in combination, a supporting framework, a dipping tank located adjacent one end of the framework, a pair of endless conveyor chains having cross rods capacitated to receive article-supporting racks, and means for driving and guiding said chains in a path including an upward slant away from said tank and a zig-zag portion through a substantial portion of the space enclosed by said framework.

In testimony whereof, we have hereunto set our hands.

JAMES SCOTT GEORGE.
ROGER S. SPERRY.